United States Patent Office 2,886,597
Patented May 12, 1959

2,886,597
STABILIZED PHENYLENE DIAMINES

David E. Graham, Westfield, and Peter O. Shull, Elizabeth, N.J., assignors to General Aniline & Film Corporation, New York, N.Y., a corporation of Delaware No Drawing. Application September 21, 1956
Serial No. 611,370

12 Claims. (Cl. 260—578)

The present invention relates to phenylene diamines which are stabilized against discoloration and decomposition by heat, light and atmospheric oxidation.

Aromatic diamines are used as intermediates for the preparation of dyestuffs, resins, especially epoxy resins, and diisocyanates for foamed plastics. Light color, and stability of composition are of considerable importance in all of these uses. Hitherto it has not been possible to obtain sufficient stability in some of the most useful of the aromatic diamines, i.e., phenylene diamines, so as to manufacture a flaked product or powder. This is a serious limitation in their commercial handling.

One method of imparting partial stability to the phenylene diamines is to introduce an inert atmosphere such as nitrogen over the diamine during storage and to use light-proof storage containers. This, however, is objectionable because the treatment is temporary and upon further handling or processing the stability is easily lost.

Another method is to stabilize aromatic amines with aromatic mercaptans, zinc aromatic mercaptides, zinc salts of the aromatic mercaptans, alkali metal and zinc salts of N-substituted dithiocarbamic acids such as, for example, sodium dimethyl dithiocarbamate, disodium ethylene bis-dithiocarbamate, zinc pentamethylene dithiocarbamate, etc. The aromatic mercaptans invert to pro-oxygenic catalysts and are inoperative with phenylene diamines. The alkali and zinc salts of N-substituted dithiocarbamates actually accelerate the oxidation of not only the phenylene diamines, but also of aniline and m-toluidine. The zinc aromatic mercaptides or zinc salts of aromatic mercaptans, while effective for certain aromatic amines, are not readily available in the chemical market and are costly to synthesize.

Organic sulfur containing compounds, such as carbon disulfide, phosphorous sulfide reaction product of a phenolic compound, etc., which have been previously proposed, tend to liberate hydrogen sulfide which is toxic, obnoxious, and presents explosion and corrosion hazards. Moreover, they are inoperative with certain types of aromatic amines and actually increase the susceptibility of such amines to oxidation.

It is an object of the present invention to provide phenylene diamines which are stabilized against atmospheric oxidation and against deterioration during storage.

Another object is to provide a novel method for stabilizing phenylene diamines against discoloration and decomposition by heat, light and air.

Further objects and advantages will become manifest from the following description:

We have found that phenylene diamines, o-, m-, and p-phenylenediamines, are readily and efficiently stabilized against oxidation and deterioration by the presence in the phenylenediamine, of a stabilizing amount of a reaction product of a thiourea and a phenylenediamine, hereinafter referred to as stabilizer.

In carrying out the present invention, the stabilizer is prepared by (1) heating a mixture of 1% to 50% by weight of a thiourea with 50 to 99% by weight of a phenylenediamine at a temperature ranging from 100° C. to its boiling point at atmospheric pressure and at a pressure of from 2 mm. of mercury to atmospheric pressure, or (2) by adding from 0.5 to 10% by weight of a thiourea to a phenylene diamine and distilling the mixture at from 115° C. at 1 mm. of mercury to its boiling point at atmospheric pressure. In the first case, the reaction product is prepared separately and then added to a fresh distilled phenylenediamine in a concentration ranging from 0.4 to 5% by weight. In the second case, the reaction product is formed in situ during the distillation of crude or impure phenylenediamine. In both cases the stabilized phenylenediamine will not show the decomposition and discoloration evident in untreated phenylenediamines. The exact mechanism of the reaction between the phenylenediamine and a thiourea is unkown to us and, accordingly, we do not intend to give a full and exact explanation thereof. Nevertheless, it is our belief that a reaction product of some kind is definitely formed by either one of the foregoing procedures having excellent stabilizing properties when present in a phenylenediamine. The addition of a thiourea in any of the aforementioned proportions at room temperature to a phenylenediamine will not yield a stabilized product.

As examples of thioureas, which are employed in accordance with the present invention, the following are illustrative:

Thiourea
Ethylene thiourea and sym- and asym-alkyl thioureas having the following general formula:

wherein R represents an alkyl group of from 1 to 3 carbon atoms, and $R_1$ represents either hydrogen or an alkyl group of the same value as in R. Specific compounds falling within the general formula include:

N-methyl thiourea
N-ethyl thiourea
N-n-propyl thiourea
N-iso-propyl thiourea
N,N'-dimethyl thiourea
N,N'-diethyl thiourea
N,N'-dipropyl thiourea In order to more clearly illustrate the invention and to show the preferred mode of carrying the same into effect, and the advantages resulting therefrom, the following examples are given:

Example I

A mixture consisting of 22.8 grams of thiourea and 324 grams of m-phenylenediamine was heated under nitrogen atmosphere to 130° C. The temperature was increased 5° C. per hour to 155° C. and held one hour on temperature. Thereafter the reaction product was allowed to cool to room temperature.

To 30 grams of freshly distilled m-phenylenediamine 1.25 grams of the above reaction product were added and the mixture subjected to 90° C. temperature for 16 hours and 90° C. for 40 hours in the presence of light. The normal decomposition and discoloration exhibited by a blank, i.e. untreated sample of m-phenylenediamine was not evident in the treated sample.

Example II

Example I was repeated with the exception that the mixture was heated under nitrogen atmosphere to 100° C. and gradually increased at 5° C. per hour to 125° C, and held for 5 hours on temperature. Thereafter the mixture was allowed to cool to room temperature, and tested as in Example I. The normal decomposition and discoloration by a blank treated sample of m-phenylenediamine was completely absent in the treated sample.

*Example III*

A mixture consisting of 50 grams of thiourea and 324 grams of o-phenylenediamine was heated under nitrogen atmosphere to 115° C. Thereafter the temperature was increased 5° C. per hour to 135° C. and held for 2 hours. The cooled mixture was tested as in Example I with the same results.

*Example IV*

To 30 grams of distilled m-phenylenediamine 0.125 gram of the reaction product of Example I was added. After 16 and 40 hours at 90° C. in the presence of light, the treated m-phenylenediamine showed no decomposition nor any discoloration as contrasted with an untreated blank which showed considerable evidence of decomposition and discoloration.

*Example V*

A solution of p-phenylenediamine and 2% by weight of ethylene thiourea was distilled at 115–118° C. and 1 mm. Hg pressure and the distillate tested against an untreated distilled sample of m-phenylenediamine. After 16 hours at 90° C. the normal decomposition and discoloration of the untreated sample was not evident in the treated material.

*Example VI*

A solution of m-phenylenediamine and 2% by weight of thiourea was distilled at 130–133° C. and 2 mm. Hg pressure and the distillate tested as in Example III. The stabilized m-phenylenediamine did not show the decomposition and discoloration evident in the untreated sample.

*Example VII*

150 grams of o-phenylenediamine and 2 grams thiourea was distilled at 135–140° C. under 17 mm. Hg pressure. The distillate was subjected to 95° C. temperature for 16 hours as was a sample of freshly distilled untreated o-phenylenediamine. The treated o-phenylenediamine produced a stabilized diamine.

The analysis of the distilled stabilized material varied from 0.03% to 0.5% sulfur by weight.

*Example VIII*

Example V was repeated with the exception that the ethylene thiourea was replaced by an equivalent amount of m-ethyl thiourea.

*Example IX*

Example VI was repeated with the exception that the thiourea was replaced by an equivalent amount of N,N'-diethyl thiourea.

*Example X*

Example VII was repeated with the exception that thiourea was replaced by an equivalent amount of N,N'-dimethyl thiourea.

*Example XI*

A solution of m-phenylenediamine and 10% by weight of ethylene thiourea was distilled at atmospheric pressure and 285° C. This temperature being the boiling point of the diamine. The distillate was then tested against untreated m-phenylenediamine distilled at atmospheric pressure. After 16 hours at 90° C. in the presence of light the normal decomposition and discoloration was not evident.

We claim:

1. A stabilized composition of matter consisting of a phenylene diamine containing, in a stabilizing amount, a reaction product of a phenylene diamine with a thiourea selected from the group consisting of thiourea, ethylene thiourea and a sym- and asym-N-alkyl thiourea wherein at least one of the N-alkyls contains from 1 to 3 carbon atoms, the said reaction product being obtained by heating a mixture of 1% to 50% by weight of said thiourea with 50 to 99% by weight of a phenylene diamine at a temperature ranging from 100° C. to the boiling point at a pressure of from 2 mm. of mercury to atmospheric.

2. A stabilized composition of matter according to claim 1 wherein the phenylene diamine is o-phenylene diamine.

3. A stabilized composition of matter according to claim 1 wherein the phenylene diamine is m-phenylene diamine.

4. A stabilized composition of matter according to claim 1 wherein the phenylene diamine is p-phenylene diamine.

5. The method of stabilizing a phenylene diamine which consists in adding to said diamine a stabilizing amount of a reaction product of a phenylene diamine with a thiourea selected from the group consisting of thiourea, ethylene thiourea and a sym- and asym-N-alkyl thiourea wherein at least one of the N-alkyls contains from 1 to 3 carbon atoms, the said reaction product being obtained by heating a mixture of 1% to 50% by weight of said thiourea with 50 to 99% by weight of a phenylene diamine at a temperature ranging from 100° C. to the boiling point at a pressure of from 2 mm. of mercury to atmospheric.

6. The method according to claim 5 wherein the phenylene diamine is m-phenylene diamine.

7. The method according to claim 5 wherein the phenylene diamine is o-phenylene diamine.

8. The method according to claim 5 wherein the phenylene diamine is p-phenylene diamine.

9. The method of stabilizing a phenylene diamine which consists in distilling said diamine in the presence of 0.5 to 10% by weight of a thiourea selected from the group consisting of thiourea, ethylene thiourea and a sym- and asym-N-alkyl thiourea wherein at least one of the N-alkyls contains from 1 to 3 carbon atoms, the said distillation being carried out at a temperature of from 115° C. at 1 mm. of mercury to the boiling point at atmospheric pressure.

10. The method according to claim 9 wherein the phenylene diamine is o-phenylene diamine.

11. The method according to claim 9 wherein the phenylene diamine is m-phenylene diamine.

12. The method according to claim 9 wherein the phenylene diamine is p-phenylene diamine.

References Cited in the file of this patent

UNITED STATES PATENTS

| | | |
|---|---|---|
| 2,047,144 | Kharasch | July 7, 1936 |
| 2,123,928 | Bousquet | July 19, 1938 |
| 2,154,341 | Martin | Apr. 11, 1939 |
| 2,493,544 | Munday | Jan. 3, 1950 |
| 2,596,742 | Vaughn et al. | May 13, 1952 |
| 2,655,543 | Linch | Oct. 13, 1953 |

FOREIGN PATENTS

| | | |
|---|---|---|
| 717,680 | Great Britain | Nov. 3, 1954 |